United States Patent

[11] 3,598,922

[72] Inventor Frank W. Ainsworth
Minneapolis, Minn.
[21] Appl. No. 657,856
[22] Filed Aug. 2, 1967
[45] Patented Aug. 10, 1971
[73] Assignee Honeywell Inc.
Minneapolis, Minn.

[54] MULTIPLEXER CONTROL APPARATUS
7 Claims, 2 Drawing Figs.

[52] U.S. Cl. .......... 179/15A, 179/15 BL
[51] Int. Cl. .......... H04j 3/04
[50] Field of Search .......... 179/15 A, 15 BS, 15 BA; 307/43; 340/183; 320/1; 307/109; 178/74, 75, 50, 51, 53, 53.1; 343/201, 203, 204, 207, 208; 328/165, 167, 104; 244/77 S, 77 SS, 77 SE, 77 M

[56] References Cited

UNITED STATES PATENTS

| | | | |
|---|---|---|---|
| 2,880,329 | 3/1959 | Rector .......... | 179/15 |
| 2,951,213 | 8/1960 | Hecht et al. .......... | 179/15 |
| 3,193,803 | 7/1965 | Hoffman .......... | 179/15 |
| 3,258,538 | 6/1966 | Searcy .......... | 179/15 |
| 2,996,629 | 8/1961 | Rhodes .......... | 328/104 |
| 3,063,662 | 11/1962 | Rotier .......... | 244/77 |

OTHER REFERENCES

Bell Laboratories Record, September 1948, " A 96-channel Pulse Code Modulation System" by C. B. Feldman pp. 364—370

*Primary Examiner*—Kathleen Claffy
*Assistant Examiner*—David L. Stewart
*Attorneys*—Roger W. Jensen, Charles J. Ungemach and Bruce C. Lutz

ABSTRACT: A multiplex fader apparatus for switching between various control system input signals without producing unwanted transients at the output of the system.

PATENTED AUG 10 1971 3,598,922

INVENTOR.
FRANK W. AINSWORTH
BY Bruce C Lutz
ATTORNEY

INVENTOR.
FRANK W. AINSWORTH
BY Bruce C Lutz
ATTORNEY

MULTIPLEXER CONTROL APPARATUS

BACKGROUND

This invention pertains to electronic condition control apparatus and more particularly to a fader circuit for selecting one of several control input signals so as to minimize possible system disturbances occurring during the transition period between operation from a first control signal of decreasing amplitude or a signal being faded out and operation from a second control signal.

The prior art circuits that were used to provide a function similar to that of the present invention required a fader circuit consisting of a resistor and capacitor for each input to the system. The use of multiple capacitors as in the prior art circuit materially increased the system weight and volume. The use of multiple capacitors also causes degraded performance of the system due to leakage and summing errors introduced by connecting multiple fader circuits to the input of the summing amplifier receiving the multiple input signals.

The present invention was developed in response to a need for a multiple channel fader circuit requiring a minimum of space and having superior summing accuracy and offset characteristics. Only two fader circuits are connected to the input of the summing amplifier because a unique multiplex switching arrangement allows two fader circuits to provide modification of a large number of input signals. The invention may be utilized in an aircraft control system having a large number of operating modes each of which is represented by a signal at a particular input. When the operating mode is changed, the signal input of a selected mode is applied and the previously selected signal is removed; the fader circuit operating to minimize the disturbance to the aircraft introduced by the switching between operating modes.

DESCRIPTION

The invention is a simple multiplex fader circuit utilizing two resistor capacitor faders and a unique switching circuit to allow two simple faders to provide a fader action for a large number of system inputs.

It is an object of this invention to provide a unique multiplex fader circuit to provide control system input signal modification during the period when a new input signal is being selected.

Further objects and advantages will become apparent from a reading of this specification and claims in conjunction with the drawings wherein:

Figure 1:
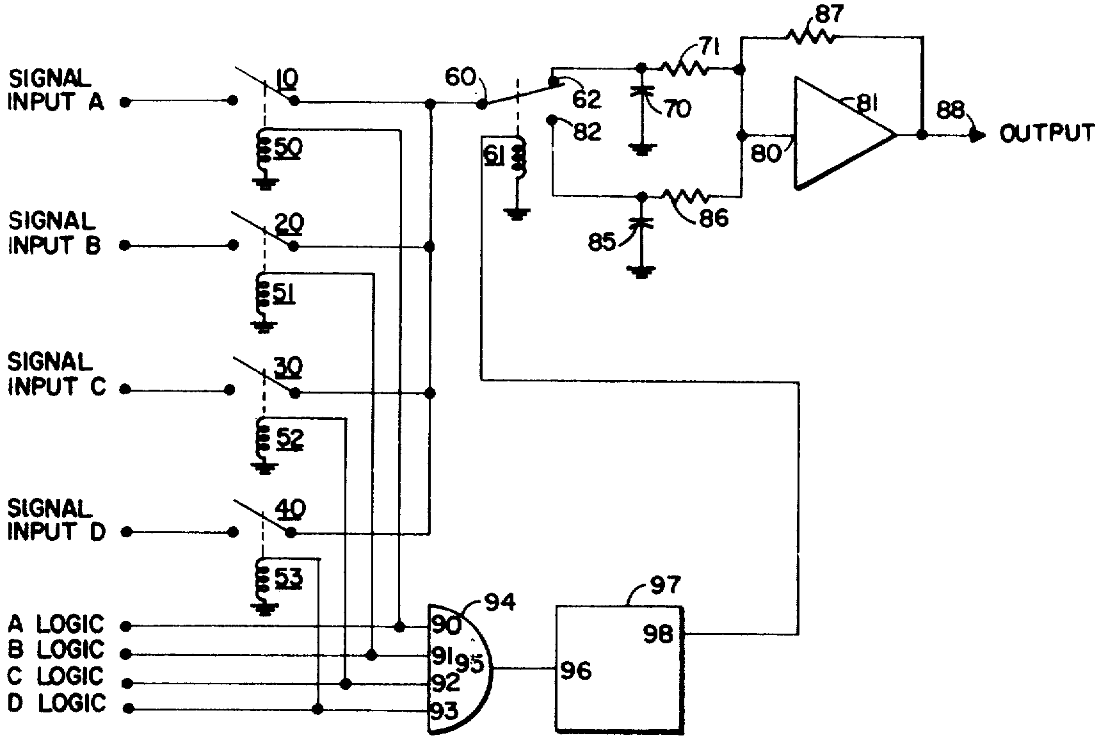
FIG. 1 is a simplified schematic of a multiplex fader using relay operated switches.

In FIG. 1 normally open relay contacts 10, 20, 30 and 40 of relays 50, 51, 52 and 53 are connected to signal inputs A, B, C and D respectively. Relays 50, 51, 52 and 53 are deenergized and contacts 10, 20, 30 and 40 are connected to a pole terminal 60 of a relay 61 which is shown deenergized. A normally closed contact or terminal 62 of the relay 61 is connected in parallel through a capacitor or energy storage means 70 to ground or reference potential and through a passive DC path, in the FIG. 1 embodiment a resistor 71, to an input 80 of a summing amplifier 81. A normally open contact or terminal 82 of the relay 61 is connected through a capacitor or energy storage means 85 to ground and through a resistor 86, which may be any element with a passive DC path, to the input 80 of the summing amplifier 81. A feedback resistor 87 is connected from an output 88 of amplifier 81 to the summing amplifier input 80. Logic inputs A, B, C and D are connected respectively to the solenoid windings of relays 50, 51, 52 and 53 as well as input terminals 90, 91, 92 and 93 of a logical OR circuit 94. An output 95 of the OR circuit 94 is connected to a trigger input 96 of a bistable element or flip-flop 97. An output 98 of flip-flop 97 is connected to the solenoid winding of the relay 61.

Figure 2:
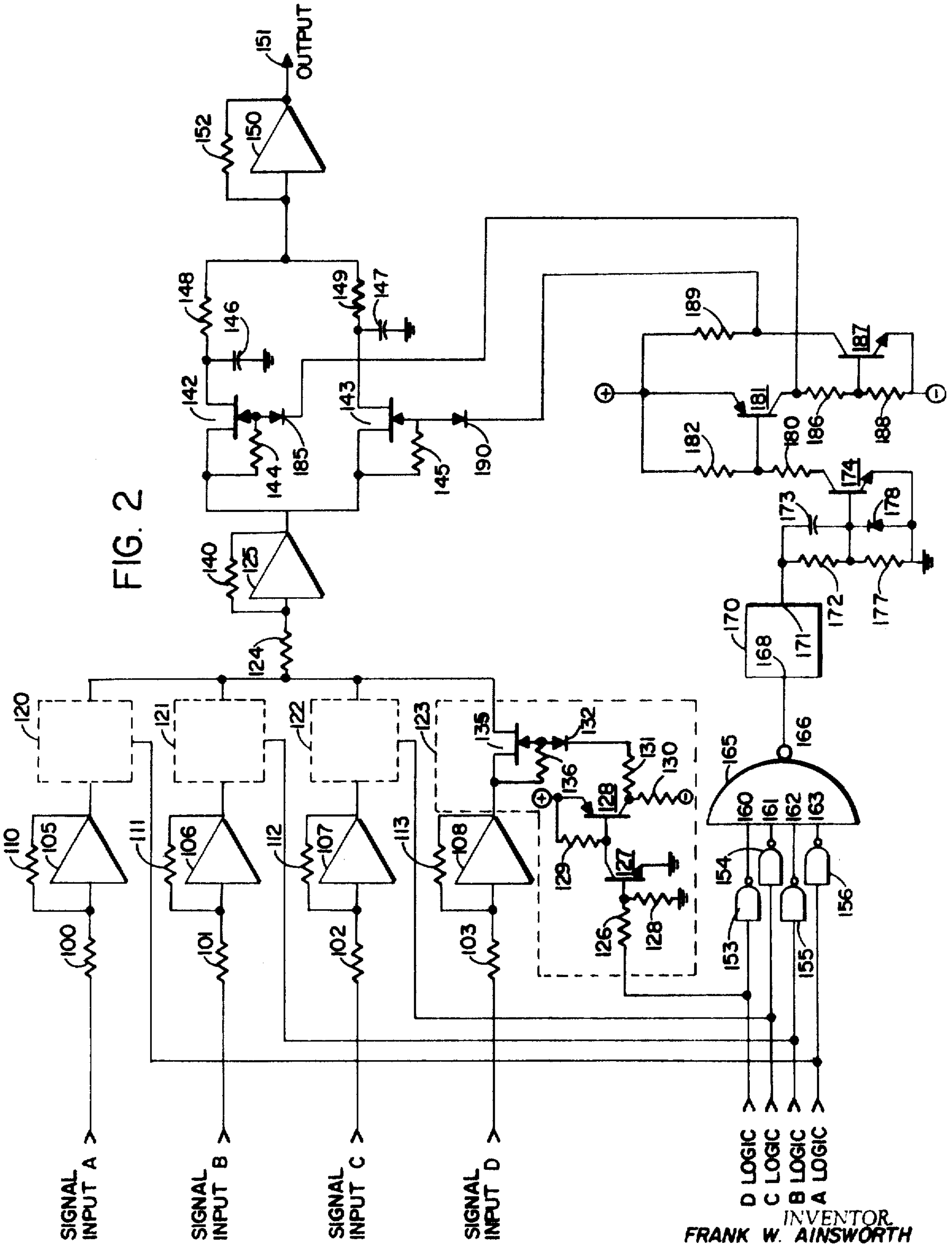
FIG. 2 is a schematic of an embodiment of the multiplex fader.

In FIG. 2, signal inputs A, B, C and D are connected respectively through resistors 100, 101, 102 and 103 to the inputs of amplifiers 105, 106, 107 and 108 respectively. Feedback resistors 110, 111, 112 and 113 are connected from the output to the input of amplifiers 105, 106, 107 and 108 respectively. The outputs of amplifiers 105, 106, 107 and 108 are connected respectively through field effect transistor switches 120; 121, 122, 123 to a resistor 124. The resistor 124 is connected to the input of an amplifier 125. The words "field effect transistor" will be abbreviated FET for the remainder of this specification.

The circuit shown for FET switch 123 is typical of the circuitry used for FET switches 120, 121 and 122. In FET switch 123 a D logic input is connected through a resistor 126 to a base of an NPN transistor 127. The base is connected through a resistor 128 to ground. The emitter of transistor 127 is grounded and the collector is connected to a base of a PNP transistor 128 and through a resistor 129 to the source of positive power supply voltage. A collector of transistor 128 is connected through a resistor 130 to a source of negative power supply voltage and through a resistor 131 to a cathode of a diode 132 which has its anode connected to a gate of an N-channel FET 135. The output of amplifier 108 is connected to a source terminal of FET 135 and through a resistor 136 to the gate terminal of FET 135. A drain terminal of FET 135 is connected to resistor 124.

The output of amplifier 125 is fed back to the input through a resistor 140 and is connected to source terminals of the FETs generally designated as 142 and 143. Resistors 144 and 145 are connected between source and gate terminals of FETs 142 and 143 respectively. Drain terminals of FETs 142 and 143 are connected respectively through resistors 148 and 149 to the input of an amplifier 150 and through capacitors or energy storage means 146 and 147 to ground. The output 151 of amplifier 150 is fed back to the input through resistor 152.

In addition to being connected to FET switches 120, 121, 122 and 123 the logic inputs A, B, C and D are also connected to positive NAND gate 153, 154, 155 and 156 whose outputs are connected co input terminals 160, 161, 162 and 163 of a positive NAND gate 165. The term positive NAND gate as used herein pertains to a particular logic element. The output of any NAND gate is a logic "0" if all of the logic inputs are logic "1's." For all other input combinations the output of the NAND gate is a logic "1." For a positive NAND gate a logic "1" is a positive level signal and a logic "0" is a zero level signal. An output 166 of the positive NAND gate 165 is connected to a trigger input 168 of a flip-flop 170. An output 171 of flip-flop 170 is connected through a parallel combination of a resistor 172 and a capacitor 173 to a base of an NPN transistor 174. The base of the transistor 174 is connected to ground through a resistor 177 in parallel with a diode 178 which is oriented with its anode connected to ground. The emitter of transistor is connected to ground. A collector of transistor 174 is connected through a resistor 180 to a base of a PNP transistor 181. An emitter of transistor 181 is connected directly to a positive supply through a resistor 181 is connected to the positive supply through a resistor 182. A collector of transistor 181 is connected to a cathode of a diode 185 which has its anode connected to the gate terminal of FET 142. The collector of transistor 181 is also connected through a resistor 186 to a base of an NPN transistor 187. An emitter of transistor 187 is connected to a negative supply and the base of transistor 187 is also connected to the negative supply through a resistor 188. A collector of transistor 187 is connected to the positive supply through a resistor 189 and is also connected to a cathode of a diode 190 which has its anode connected to the gate terminal of FET 143.

OPERATION

In FIG. 1 it will be assumed that an input A signal has been selected to be the control signal. An A logic input command will be present, actuating relay 50 and closing the normally open relay contacts 10. The input A signal passes through the contacts 10 and is conducted to either the normally open contacts 82 of relay 61 or normally closed contacts 62. Assuming that initially the output 98 of flip-flop 97 is equal to zero so that relay 61 is unenergized, the signal will be conducted to the normally closed contact 62 and through resistor 71 to amplifier 81. Capacitor 70 will be charged to a voltage equal to the voltage applied at signal input A.

When a control input other than the A input is required to operate the system, external logic, not shown in this disclosure, will remove the positive voltage corresponding to the A logic input and then apply a positive voltage to the selected logic input. When a logic input is present at input terminals 90, 91, 92 or 93 of the OR circuit 94, the output 95 will be a positive voltage. After the A logic input signal has been removed from input terminal 90, the output voltage at terminal 95 switches from a positive level to zero volts, and the negative slope of the output voltage applied to trigger input 96 of flip-flop 97 causes the flip-flop to change state producing a positive output at flip-flop output terminal 98 actuating relay 61 and closing normally open relay contacts 82. Relay 50 is deenergized when the A logic input is removed and normally open relay contacts 10 return to the open condition interrupting the input A signal. Thus, the removal of the A logic signal serves to open the normally open relay contacts 10 and also to switch relay 61 to an actuated position providing a new signal path to amplifier 81 through resistor 86. Since capacitor 70 was previously charged to a voltage equal to the voltage last present at the input A, the amplifier 81 will be receiving an input of continuously decreasing amplitude from the capacitor 70 although no inputs are being applied. The voltage across capacitor 70 will be slowly decreasing with a time constant determined by the magnitudes of resistor 71 and capacitor 70. If the signal B input is now selected, a positive logic voltage is applied to the B logic input, causing the OR gate 94 to produce a positive voltage at the output 95. The positive slope of the output voltage at the OR gate output 95 does not affect the condition of FLIP-flop 97, the output voltage from terminal 98 remains positive, and relay 61 remains actuated. When the B logic input is applied, relay 51 is actuated, closing normally open relay contacts 20, and applying the input B signal through the contacts of relay 61 and resistor 86 to the input of amplifier 81. Since the input B signal is assumed to be from a low impedance source, capacitor 85 is rapidly charged to a voltage equal to the signal voltage appearing at the input B. The amplifier 81, during the period of transition from the input A to the input B signal, will be receiving a signal proportional to the input A signal which is decreasing in amplitude with time and an additional signal which is directly proportional to the input B signal.

The operation of the circuit in FIG. 2 is quite similar to the operation of the circuit in FIG. 1. If the input D signal is selected as a control signal, the D logic input is a positive voltage level and is transmitted to the FET switch 123. The positive input voltage turns transistors 127 and 128 ON placing a positive voltage at the cathode of diode 132 which removes the back-bias from the gate of FET transistor 135, producing a low impedance path between the source and the drain of the FET transistor 135. Resistor 136 has a high resistance and is placed in shunt between the source and the gate of FET transistor 135 to be used as a "bleeder" to properly bias the FET 135. Thus, with the positive logic command, FET switch 123 forms a low resistance shunt path between the output of amplifier 108 and the input summing resistor 124 of amplifier 125. The positive voltage level corresponding to the D logic input is also applied to the positive NAND gate gate 153, producing a zero output signal which is applied to logic input terminal 160 of the positive NAND gate 165 producing a positive output at terminal 166. A zero output of the positive NAND gate 153 when applied to the input 160 of the NAND gate 165 produces a positive level output. It will be assumed that the flip-flop 170 is in an ON condition and a positive DC voltage is present at the output 171. The positive DC voltage at output 171 introduces a current through resistor 172 to the base of the transistor 174, turning transistor 174 ON and in turn turning transistor 181 ON so that the voltage at the collector of transistor 181 approaches the positive power supply voltage, removing the back-biasing voltage on FET 142, and thereby producing a low impedance path between the source and the drain of FET 142. When transistor 181 is turned ON, a current passes through resistor 186 to the base of transistor 187 which is also turned ON, forcing the voltage at the collector of transistor 187 to approach the negative power supply voltage and back-biasing FET 143, thus producing a high impedance path between the source and the drain of FET 143. For the condition assumed the input D signal passes through amplifier 108, FET switch 123, summing amplifier 125 and FET transistor 142 to charge capacitor 146 and supply in input to the amplifier 150.

When the external logic requires that a different input signal be selected, the D logic command is removed. When a positive voltage representing the D logic command is removed, transistor 127 is turned OFF, causing transistor 128 to the back-biased and a negative voltage applied to diode 132, back-biasing FET 135, and causing a high resistance path to be produced between the source and drain of FET 135.

The removal of the D logic command from the input to positive NAND gate 153 also changes the output of the positive NAND gate from zero volts to a positive voltage. The positive voltage from the output of NAND gate 153 when applied to input terminal 160 of positive NAND gate 165 causes the output 166 of NAND gate 165 to switch from a positive voltage to zero volts. The negative slope of the voltage at the NAND gate output terminal 166 when applied to the trigger input 168 causes the flip-flop 170 to change state and the voltage at output terminal 171 to switch from a positive level to zero volts. When the voltage at terminal 171 switches to zero volts, transistor 174 is rapidly turned OFF and in turn turns OFF transistors 181 and 187. When transistor 181 is turned OFF the voltage at the collector approaches the negative power supply voltage and applies this negative voltage to diode 185, back-biasing FET 142 and imposing a high impedance path between the source and drain of FET 142. When transistor 187 is turned OFF, the voltage at the collector approaches the positive power supply voltage and removes the back-bias from FET 143, providing a low impedance path between the source and drain of FET 143. Thus, removal of the selected logic input command causes the FET switch 123 to open, removing the signal from amplifier 125 and causing flip-flop 170 to change state providing an alternate path for the output of summing amplifier 125 while the input D signal stored across capacitor 146 continues to drive the output amplifier 150.

After the removal of the D logic signal another signal is selected. Assuming the input A signal is selected and an A logic command is applied with the A logic input causing FET switch 120 to be placed in a conducting condition allowing the input A command to be conducted from amplifier 105 through FET switch 120, summing amplifier 125 and FET 143, to the output amplifier 150.

The application of the positive A logic voltage to positive NAND gate 156 causes a zero level signal to be applied to input terminal 163 of positive NAND gate 165. The output 166 of positive NAND gate 165 switches from zero volts to a positive DC level when an A logic input is applied. The positive slope of a signal applied to trigger input 168 does not cause flip-flop 170 to change state and FET transistor 143 remains in conduction. Thus, it can be seen that when it is desired to change signal sources, the FET conducting the previously selected signal is turned OFF allowing the signal remaining on the capacitor 146 to continue to drive output amplifier 150 until capacitor 146 discharges; while at the same time the selected signal drives amplifier 150 as soon as it is selected because the charging time constant of capacitor 147 is very short. When another signal is desired the process is the same except FET 143 is turned OFF and capacitor 147 continues to supply a decreasing signal representative of the last value of the input A signal while FET 142 instantaneously supplies the selected signal.

It is obvious that there is no limitation on the number of inputs that may be modified by the techniques of this invention. All that is required to add an additional input is the additional input circuitry and additional logic capability. It is also obvious that the advantages of this invention over the prior art increase considerably as the number of input channels is increased.

The mechanization of the logic used to drive the flip-flop is susceptible of many modifications without altering the basic function. FIG. 1 illustrated the use of simple OR gate. FIG. 2 illustrated the mechanization of an OR gate using NAND gates. Both logic circuits provide a negative going signal to trigger flip-flop 170 or 97 when the selected logic input command is removed.

Other alterations and variations will be obvious to those skilled in the art. I do not wish to be limited to the specification or the preferred embodiment shown in the figures but only by the following claims.

I claim:

1. Multiplexer apparatus for changing from one input signal to another, comprising:
   - first electrical means for receiving a plurality of input signals and providing therefrom sequential output signals selected from the plurality of input signals;
   - second electrical means, having two output terminals, for receiving the sequential output signals from said first electrical means and alternately switching successive output signals from said first electrical means from a first output terminal to a second output terminal whenever the selected sequential output signal from the plurality of input signals is no longer supplied to said second electrical means;
   - third electrical means, having an output, for receiving and storing an input signal from the first output terminal of said second electrical means;
   - fourth electrical means, having an output, for receiving and storing input signal from the second output terminal of said second electrical means; and
   - signal summing means including output means, said summing means continuously connected for receiving input signals from the outputs of said third electrical means and said fourth electrical means and producing an output signal equal to the sum of the signals received from said third electrical means and said fourth electrical means whereby when a transition is made from one input signal to a different input signal the output signal changes gradually from the level corresponding to said one input signal to that level corresponding to said different input signal.

2. Multiplexer apparatus as in claim 1, wherein said third electrical means and said fourth electrical means include individual energy storage means providing a signal to said summing means during the period of transition from a one selected input signal of the series to a subsequently selected input signal.

3. Multiplexer apparatus as in claim 1 wherein the switching means in the second electrical means comprise two semiconductors each having a selectively controlled conduction regulating electrode.

4. Multiplexer apparatus as in claim 1, wherein said third electrical means and said fourth electrical means each comprise a separate capacitor connected to be charged by a source of input signal to a voltage equal to that appearing at the output terminal of said second electrical means and a separate resistor connecting the capacitor to the output of the respective electrical means.

5. Multiplexer apparatus for condition control apparatus for selecting one of several input signals comprising, in combination:
   - input signal selection means, including output means, for supplying one at a time a series of a plurality of received input signals to said output means;
   - first and second alternate signal energy storage means having a common output to which said first and second alternate signal energy storage means are both continuously connected thru passive resistive paths; and
   - switching means for alternately supplying successively selected input signals in said series from said selection means to said alternate energy storage means so that a last selected input signal in said series is temporarily supplied to said common output from one of said energy storage means while a previously selected input signal is also being supplied to said common output through the other of said energy storage means.

6. The multiplexer apparatus of claim 5, wherein the plurality of signals is greater than two and wherein the first and second energy storage means are responsive alternately to the successive signals in the series, one storage means receiving the odd numbered signals in the series and the other storage means receiving the even numbered signals in the series.

7. A multiplex fader circuit, comprising:
   - switching means for selecting sequentially for transmission any signal from among a plurality of signals;
   - first fader means, including an input and an output, for providing at its output a continuously diminishing amplitude signal when a signal is no longer supplied to its input, comprising energy storage means connected between said input means and said output means;
   - second fader means including input means and output means, for providing at its output a continuously diminishing amplitude signal when a signal is no longer supplied to its input, comprising energy storage means connected between said input means and said output means the input means of said first and second fader means being alternately connectable to the switching means for receiving the selected signal; and
   - summing means connected concurrently to the output means of said first fader means and said second fader means for producing an output equal to the sum of the signals received from said fader means, said switching means being connected to one input means following removal of the selected signal from the other input means.